United States Patent Office 3,006,661
Patented Oct. 31, 1961

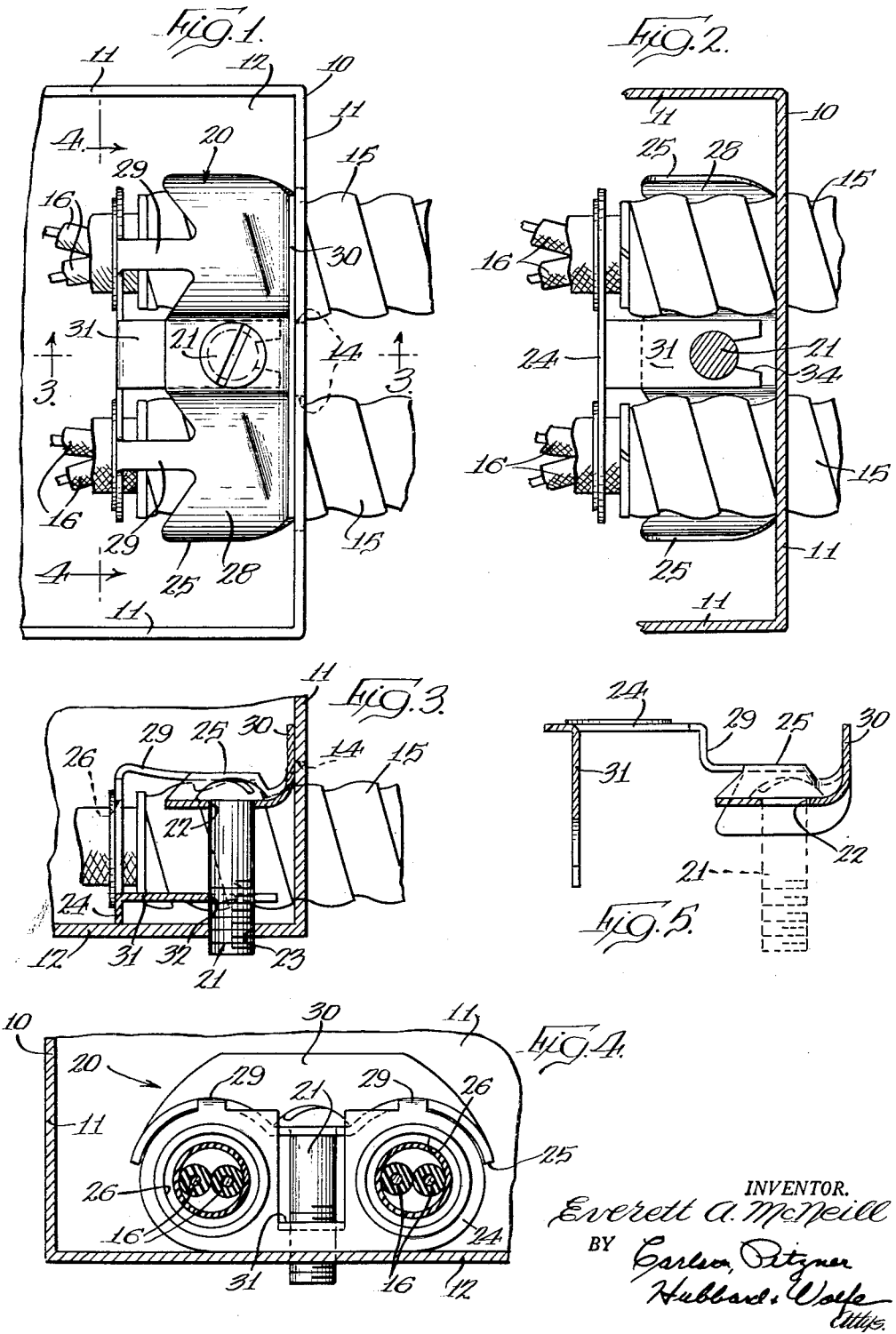

3,006,661
CABLE CLAMP FOR CONNECTING BOXES
Everett A. McNeill, Baldwin, N.Y., assignor to Appleton Electric Company, Chicago, Ill., a corporation of Illinois
Filed Jan. 19, 1959, Ser. No. 787,770
1 Claim. (Cl. 285—12)

The present invention relates to an improved cable clamp for use in clamping armored and insulated cables within electrical connection boxes. More specifically, the invention relates to cable clamps of the type shown in U.S. Reissue Patent No. Re. 19,389, which clamps are composed generally of two wings, one of which stands at right angles to a box wall which is parallel to the incoming conduit and is provided with openings through which conductors from the cable pass while the other wing is adapted to engage with and clamp the conduits and also with the wall through which the conduits pass.

One object of this invention is to provide an improved cable clamp of the above type which is positively held in position in the box by a fastening screw and which can be clamped in place to hold either armored cables or nonmetallic sheathed cables without interference with the connectors carried thereby. It is another object of the invention to provide an improved cable clamp of the foregoing character which, when mounted in a box by a suitable screw or other appropriate fastener element, will not slip out of alinement with the cable entrance openings in the box wall.

A further object of the invention is to provide an improved cable connector of the above characteristics in which one of the wings can be swung upwardly and out of the way so that the clamp may be used for nonmetallic sheathed cable without disengaging the clamp and fastening screw from the box.

Other objects and advantages of the present invention will become apparent as the following description proceeds taken in connection with the accompanying drawing wherein:

FIGURE 1 is a plan view of a connection box and a cable clamp illustrative of the present invention clamping two armored cables therein.

FIG. 2 is a bottom view of the box cable clamp and cables shown in FIG. 1 with the bottom of the box removed.

FIG. 3 is a section view taken substantially in the plane of line 3—3 of FIG. 1.

FIG. 4 is a section view taken substantially in the plane of line 4—4 of FIG. 1.

FIG. 5 is a side view of the cable clamp illustrative of the invention but with one wing bent upwardly and away from the other preparatory to severing the two so that the clamp may be used for nonmetallic sheathed cable.

While a certain illustrative cable clamp has been shown in detail, it should be understood that there is no intention to limit the invention to the specific form disclosed. On the contrary, the intention is to cover all modifications, alternative constructions, equivalents, and uses falling within the spirit and scope of the invention as expressed in the appended claim.

Referring to the drawings there is shown in FIG. 1 an electrical box 10 having a plurality of perpendicularly disposed side walls 11 and a bottom wall 12. In one of the side walls 11 just above the bottom wall there is provided a pair of holes 14 through which the ends of cables 15 may be inserted. The cable shown in FIG. 1 is of the armored type having a spirally wound metal sheath thereon, this type of cable being commonly known in the trade as BX cable. Sheathed within the cable are a plurality of conductors 16. When the armored cable is to be used, a portion of the metallic sheathing is stripped therefrom leaving the conductors 16 and their insulating sheathing exposed. The holes 14 through the box wall 11 are generally large enough to accommodate the metal sheath, and are often larger to facilitate insertion of the cable.

In order to securely clamp the ends of the cable within the box, there is provided a clamping device, indicated generally at 20, which is held within the box by a headed fastening screw 21 threadably engaged in an opening 22 in the bottom of the box at a point adjacent the wall 11 defining the openings 14 through which the cables 15 pass. The clamping device may be made of any suitable material and is preferably constructed of a single piece of sheet metal cut and formed such as by stamping, into the desired shape. The clamping device 20 as shown in the drawings, is composed of two main wings 24 and 25, the first of which 24 having a pair of large holes 26 (FIG. 4) through which the conductors 16 may be led. This wing when mounted in the box, remains generally at right angles to and is supported on the bottom wall 12 of the box and parallel with the side wall 11 which it faces and in which the cable receiving openings 14 are provided. The clamp is constructed so that the holes 26 in the wing 24 are generally alined with the holes 14 of the box wall. The edges of the holes 26 are preferably rounded to avoid cutting the insulating sheath of the conductor 16. The second wing 25 is formed with an aperture 27 for receiving the fastening screw 21, and, on opposite sides of said aperture, with bowed end portions 28 which are adapted to fit over and correspond generally to the armored sheath of a pair of conduits entering the box. For clamping the conduits beneath the bowed portions 28 of the wing 25 and with the conductors 16 therefrom extending through the apertures 26 in the wing 24, the clamp is initially formed so that the two wings are disposed approximately at a right angle to each other as shown in FIG. 3.

The two wings are connected together at laterally spaced points at the angular corner therebetween by means of narrow strips 29 integral with the upper edge of the wing 24 and the adjacent edge of the second wing 25. The width of the second wing 25 is such that its free longitudinal edge will engage with the inner face of the box side wall 11 when the clamping device is in position, while the first wing 24 is of such width that its longitudinal free edge will rest on the bottom 12 of the box when the holes 26 therethrough are alined with the holes 14 in the box wall 11. Under these conditions, the connecting strips 29 are spaced from the box wall. If desired, the second wing 25 may be formed at its free edge with an upwardly extending flange 30 adapted to rest against the surface of the box wall 11 and to form a closure for the open portions of the holes 14 when the cables 15 are inserted therein and the clamp is tightened to grip the cables to the box.

For purposes of positively holding the cable clamp initially in position with its conductor receiving holes 26 in alinement with the box wall holes 14, and with the clamping wing spaced above the holes to avoid interference with cables being inserted into the box, the first wing 24 is provided with a rearwardly extending tongue 31 having a hole 32 therein in alinement with the hole 27 in the second wing 24 for receiving the fastening screw 21. The tongue 31, which may be formed by striking a strip of metal from between the wings 24, 25 during the stamping of the clamp, is positioned adjacent the free or lower edge of the first wing 24 and extends therefrom in a direction parallel to but spaced from the second wing 25. When the tongue is engaged with the screw 21, the clamp is given an effective two point support on the screw, and thus is held in alinement with the box openings and with the clamping wing raised to facilitate the insertion of the cables. Initially, the clamp may be loosely secured in the box by the screw and the conductors are then inserted through the box wall so that the conductors project through the holes in the clamp with the armored sheath positioned beneath the second or clamping wing 25. By tightening the screw 21 into the bottom box wall, the second wing 25 is pulled downwardly into clamping engagement with the conduit so that it is securely wedged between the bottom edge of the wall openings 14 and the clamp wing 25. With the flange 30 abutting the box wall, the clamp is held positively in place with the holes 26 in alinement with the holes in the box wall. The tongue 31, being positioned beneath the conduits, does not interfere with the clamping operation.

In the event a cable having a nonmetallic sheath thereon is to be clamped in the box, the use of the first wing 24 and its conductor receiving openings 26 becomes unnecessary and in many instances, this wing is removed to increase the wiring room available in the box. To accomplish this it is desirable that the first wing 24 be removable without disassembling the screw and cable clamp from the box. With the present invention, this is done by inserting a screwdriver or other suitable tool into one of the openings 26 and prying the first wing upwardly as shown in FIG. 5. This wing can then be severed from the second wing 25 by cutting the connecting strips 29.

In order that the tongue be readily removable from the fastening device when the first wing is to be severed from the clamp, there is provided therein a tapered slot 34, the narrow end of which intersects the hole 32 through which the fastening screw is inserted. The slot 34 is narrower than the diameter of the hole so that the screw is normally held securely within the tongue. When the first wing is to be removed, however, the slot 34 enables the screw to slip out of the hole so that the clamp may be bent to a position as shown in FIG. 5. It will be appreciated that this can be done even after the cables have been inserted into the box and the clamping wing 25 has been urged into clamping engagement with them. When the first wing 24 has been removed as described, the cables prevent the clamping wing from dropping and obstructing the cable entrance apertures in the box wall. If the clamp is not tightened completely, the cables can then be pushed further into the box, and when the desired length is provided, the clamping wing 25 can be further tightened securely into place against the cables.

I claim as my invention:

In a clamping member for securing cables or the like to a connecting box having side walls and a bottom wall, the cables entering the box through suitable openings in one side wall of the box adjacent the bottom wall thereof, the combination comprising a pair of connected main wings disposed at approximately a right angle with respect to each other, the first of said wings having a pair of spaced openings enabling a pair of cables to be passed through the same via the box wall openings, the second of said wings being spaced from the bottom wall of the box and defining spaced clamping means for gripping said cables, said second wing having a hole intermediate said clamping means for receiving a fastening element engageable with the box for mounting said clamping member therein, a pair of relatively narrow bendable and severable elements connecting said wings at laterally spaced points at the angular corner therebetween, said clamping member being mounted with said bendable elements spaced from the box walls and bottom wall, an elongate tongue connected to said first wing and extending therefrom adjacent the bottom of the box in spaced generally parallel relation with said second wing, said tongue having an aperture alined with the hole in said second wing and of such a size to relatively snugly receive the fastening element, said tongue also having a longitudinal slot parallel to said narrow elements intersecting said aperture, and said slot being of a width slightly smaller than the diameter of said fastening element, whereby said tongue may be separated from the fastening element when said first wing is bent upwardly and away from said second wing while the fastening element remains engaged with the box, and said first wing may be separated from said second wing by severing said narrow elements.

References Cited in the file of this patent
UNITED STATES PATENTS

| | | |
|---|---|---|
| 1,038,664 | Schell | Sept. 17, 1912 |
| 2,444,092 | Clayton | June 29, 1948 |
| 2,512,690 | Smith | June 27, 1950 |
| 2,674,913 | Thomas | Apr. 13, 1954 |
| 2,708,122 | Clark | May 10, 1955 |